United States Patent [19]

Lott

[11] 3,878,164

[45] Apr. 15, 1975

[54] TETRAFLUOROETHYLENE POLYMER COMPOSITIONS

[75] Inventor: Alfred Robert Lott, Welwyn Garden City, England

[73] Assignee: Imperial Chemical Industries Limited, London, England

[22] Filed: June 29, 1972

[21] Appl. No.: 267,653

[30] Foreign Application Priority Data
July 2, 1971 United Kingdom............... 31119/71
July 2, 1971 United Kingdom............... 31120/71

[52] U.S. Cl.......... 260/42.27; 260/33.6 F; 260/900; 264/176 R; 264/211; 204/159.2
[51] Int. Cl................................................ B01j 1/10
[58] Field of Search ......... 204/159.2; 260/41, 42.27

[56] References Cited
UNITED STATES PATENTS
2,456,621 12/1948 Cheney............................... 264/122
2,882,254 4/1959 Kloepfer et al........................ 260/41
3,766,031 10/1973 Dillon.............................. 204/159.2

OTHER PUBLICATIONS

Schildknecht, Calvin E., Vinyl and Related Polymers, 1952, John Wiley & Sons, Inc., New York, pages 487–494.

Chapiro Adolphe, Radiation Chemistry of Polymer Systems, 1962, Interscience Pub., New York, pages 526–531.

*Primary Examiner*—Allan Lieberman
*Assistant Examiner*—J. H. Derrington
*Attorney, Agent, or Firm*—Cushman, Darby & Cushman

[57] ABSTRACT

Paste extrusion polymers of PTFE having improved paste extrudability and powder flow properties are produced from coagulated dispersion grades of PTFE by irradiation with ionising irradiation to a dose of 0.01 to 1.0 Mrad.

9 Claims, No Drawings

TETRAFLUOROETHYLENE POLYMER COMPOSITIONS

This invention relates to tetrafluoroethylene polymers and in particular to improved tetrafluoroethylene homopolymers or copolymers of tetrafluoroethylene with a small amount, for example up to 10% by weight, of a comonomer such as ethylene or hexafluoropropylene. For convenience such tetrafluoroethylene polymers and copolymers will be referred to hereinafter as PTFE.

One of the well known methods of fabricating PTFE is by the so-called paste extrusion process wherein a particular type of PTFE, the coagulated dispersion grades, is admixed with a volatile lubricant and is thereafter extruded at a relatively low temperature, of the order of 30°C, into the desired form. The extruded article is then heated to volatilise the lubricant and is then generally sintered to transform the PTFE in the article to a homogeneous mass.

One of the disadvantages of coagulated dispersion grades of PTFE is that they are generally of a very cohesive nature when in powder form and exhibit very poor powder handling properties. This renders the handling, transportation and storage of the powders difficult and may lead to difficulties in producing a homogeneous blend of PTFE powder and lubricant. A further problem, in the paste extrusion process, is that some PTFE/lubricant compositions require very high pressures in order to extrude the material into the desired form. This places a limitation on the amount of material that may be extruded in one continuous operation. This is because the greater the magnitude of the ratio of the cross-section of the barrel of the extruder to the cross-section of the die through which the composition is extruded the greater is the pressure required to extrude the composition. The result is that with some powders articles of small cross-section can only be extruded using a barrel of relatively small size because the use of a larger barrel would require an extrusion pressure outside the limitations of the extrusion machine. With these problems in mind a modified form of coagulated dispersion grade of PTFE has been devised.

Accordingly, there is provided a method for the production of a coagulated dispersion grade of tetrafluoroethylene polymer suitable for paste extrusion wherein a coagulated dispersion grade of a tetrafluoroethylene polymer is subjected in powder form to ionising radiation until it has received a dose of radiation within the range 0.01 to 1.0 Mrad.

By the term "coagulated dispersion grade of a tetrafluoroethylene polymer" is meant those grades of PTFE powder obtained by the coagulation of an aqueous dispersion of PTFE made by the polymerisation of tetrafluoroethylene, optionally together with up to 10% by weight of one or more comonomers, dispersed in an aqueous medium with the aid of an emulsifying agent which is generally highly fluorinated. The production of such PTFE dispersions is described in, inter alia, British Patent Specification 689 400. Examples of commercially available coagulated dispersion polymers are 'Fluon' CD1, CD4 and CD042 sold by Imperial Chemical Industries Limited.

It has been found that by subjecting these coagulated dispersion grades of PTFE to ionising irradiation, for example $\gamma$-irradiation, the polymer powder exhibits improved powder flow properties and, when compounded with lubricants improved paste extrudability. By improved paste extrudability is meant a reduction in the extrusion pressure required to extrude the material and in some cases an improvement in the quality of the extrudate. This is achieved by irradiation to a relatively low dose. The dose of irradiation should be within the range 0.01 to 1.0 Mrad. If doses of less than 0.01 Mrad are used then little improvement over virgin coagulated dispersion grades of PTFE are observed. Likewise, the improvement obtained by irradiation diminishes if the dose of radiation exceeds 1.0 Mrad and, in particular the extrusion of such materials gives irregular extrudates of poor quality. Preferably the radiation dose is within the range 0.02 to 0.8 Mrad and particularly within the range 0.05 to 0.5 Mrad.

The coagulated dispersion polymer may be irradiated by methods well known in the art including the use of $\gamma$-irradiation or high energy electron beams. Convenient methods include irradiation by a $Co^{60}$ source or by immersing the polymer sealed in a sealable container, for example an aluminium canister, in a spent fuel element pond.

The process of irradiation is normally performed at ambient temperature. Although polymers having satisfactory properties are obtained at irradiation temperatures up to about 200°C it is preferred that temperatures of less than about 120°C are used because the paste extrudability of the powder may be impaired by heating above 200°C.

The irradiated coagulated dispersion grades of PTFE according to the invention may be used as such or may be admixed with virgin coagulated dispersion grades of PTFE to produce a paste extrusion grade of polymer having a reduced extrusion pressure. Powder flow improving agents such as small particle size silicas or aluminas may be mixed with the irradiated coagulated dispersion grades of the invention and the admixtures of irradiated materials with virgin coagulated dispersion grades.

The irradiated dispersion grades of this invention are particularly useful for admixing with virgin coagulated dispersion grades of PTFE to which finely divided silica has been added as a flow-improving additive at concentrations between 0.025% and 2% by weight based on the weight of PTFE. It has been observed that whilst finely divided silica can give rise to very marked improvements in flow properties this improvement is accompanied by an increase in the pressure required to extrude the silica-containing powders when lubricated as described hereinbefore. This increase in extrusion pressure can be avoided and the improved flow properties conferred by the silica can be retained and in some cases improved by adding small quantities of the irradiated polymers of this invention to the mixture of the virgin coagulated dispersion grade of PTFE and the finely divided silica. Paste extrusion grade powders having improved flow properties and reduced extrusion pressures are produced by blending from 1 to 10% by weight (based on the total weight of the blend) of the irradiated coagulated dispersion grade of this invention with 99% to 90% (by weight of the blend) of a virgin coagulated dispersion grade of PTFE containing from 0.025% to 2% by weight based on the weight of said virgin PTFE of a finely divided silica, preferably having an average particle size of between 1 $\mu$m and 15 $\mu$m. Optimum results are obtained using from 0.5 to 2% by weight of the finely divided silica.

The irradiated coagulated dispersion grade of this invention contained in the blend is obtained as hereinbefore described by irradiation at a dose within the range 0.01 to 1.0 Mrad. Preferably, the dose is within the range 0.1 to 0.5 Mrad and particularly within the range 0.15 to 0.3 Mrad.

The amount of irradiated coagulated dispersion grade of PTFE that should be added is within the range from 1% to 10% by weight, based on the weight of the admixture. Preferably the amount of irradiated coagulated dispersion grade of PTFE is within the range 2 to 7% by weight, based on the weight of the admixture.

The process of blending the ingredients to form these improved coagulated dispersion powders is carried out under relatively mild conditions and any mechanical mixer which imparts a tumbling action to the ingredients may be used. The conditions of mixing should not be so severe as to cause the coagulated dispersion powder to be sheared because the presence in the composition of material which has been damaged by a shearing action results in imperfections in articles extruded from such compositions.

The irradiated powders of the invention and blends thereof with virgin coagulated dispersion grades of PTFE and additives such as flow improving additives may be used for any of the applications in which virgin coagulated dispersion grades of PTFE are employed. These include the fabrication by the paste extrusion technique herein described followed by sintering of articles such as rod, pipe, tube and wire coverings. Additionally, unsintered rod extruded from the materials of the invention may be converted into unsintered tape for thread-seal applications.

The invention is illustrated by the following examples.

EXAMPLE 1

2 kg samples of PTFE coagulated dispersion polymer known as 'Fluon' CD1 sold by Imperial Chemical Industries Limited were irradiated in sealed aluminium canisters by $\gamma$-irradiation provided by a spent fuel element pond. The dose received by each sample, the flow properties of the resulting powder and the extrusion pressure of the powder are recorded in the table below.

| Sample | Irradiation Dose (Mrad) | Compacted Flow Rating Scale 1 | Scale 2 | Extrusion Pressure (MN/m$^2$) |
|---|---|---|---|---|
| A | Nil | 16 | | 100 |
| B | 0.05 | 36 | | 73 |
| C | 0.1 | >36 | 9 | 60 |
| D | 0.2 | >36 | 16 | 46 |
| E | 0.5 | 16 | | |

The compacted flow rating of the powders was determined by a method based on that described in United Kingdom Specification No. 1 076 642 and is expressed by a number being either 1, 4, 9, 16, 25 or 36, an increase in magnitude in the number indicating an improvement in flow. The figures quoted in the table under the heading 'Scale 1' were determined exactly as described in the test method of United Kingdom Specification No. 1 076 642. The method is however unsuitable for distinguishing between polymers which have excellent flow properties. The results obtained under the heading 'Scale 2' were therefore obtained by modifying the test to use a hopper vibrating with an amplitude of approximately 0.4 mm compared with an amplitude of approximately 1.6 mm used for the results determined under 'Scale 1'. A compacted flow rating of 1 on 'Scale 2' is slightly better than a rating of 36 on 'Scale 1'.

The results indicate that the flow properties of the powder examined improved with increasing radiation dose up to 0.2 Mrad but at a dose of 0.5 Mrad the flow was no better than that of unirradiated material.

The extrusion pressure of the powders were determined by a standard test as follows. A sample of powder was conditioned below 20°C for a period of not less than 16 hours and then sieved through a British Standard 8 mesh sieve. 175 g of this powder was placed in a 0.5 litre bottle and 44 ml of a liquid hydrocarbon lubricant known as "Isopar" H was added from a burette. This gave a composition containing 16% by weight of lubricant. The bottle was sealed and rolled for 30 minutes and then stored at 25°C for not less than 4 hours. The sample was then slowly preformed to a pressure of 3.5 MN/m$^2$ over a period of 5 minutes into a cylinder 3.8 cm in diameter. The preform was held at this pressure for a further 5 minutes. The preform was then extruded at 30°C by a hydraulic extruder using a linear ram speed of 2.03 cm per minute, through a die having a land diameter of 0.127 cm and a land length of 0.635 cm and an included angle of 20°. The ratio of the cross-sectional area of the barrel of the extruder to the cross-sectional area of the die is 900:1. The pressure required to extrude the polymer is measured by means of a pressure transducer.

EXAMPLE 2

The procedure of Example 1 was repeated using a PTFE coagulated dispersion powder known as 'Fluon' CD042 and sold by Imperial Chemical Industries Limited. The flow properties and extrusion pressure were measured as described in Example 1 and the results obtained are tabulated below.

| Sample | Irradiation Dose (Mrad) | Compacted Flow Rating Scale 1 | Scale 2 | Extrusion Pressure (MN/m$^2$) |
|---|---|---|---|---|
| F | Nil | 16 | | 57 |
| G | 0.05 | >36 | 16 | 44 |
| H | 0.1 | | | 39 |
| I | 0.2 | | | 32 |
| J | 0.5 | 25 | | 39 |
| K | 1.0 | 9 | | 43 |

EXAMPLE 3

2 kg samples of a PTFE coagulated dispersion polymer known as 'Fluon' CD023 sold by Imperial Chemical Industries Limited were irradiated in sealed aluminium canisters by $\gamma$-irradiation provided by a spent fuel element pond. The dose received by each sample, the flow properties of the resulting powder and the extrusion pressure of the powder are recorded in the table below.

| Sample | Irradiation Dose (Mrad) | Compacted Flow Rating Scale 1 | Compacted Flow Rating Scale 2 | Extrusion Pressure (MN/m²) |
|---|---|---|---|---|
| A | 0.02 | 16 | | 129 |
| B | 0.05 | 25 | | — |
| C | 0.10 | | 16 | 103 |
| D | 0.2 | | 16 | 82 |
| E | 0.5 | | 16 | 56 |
| F | 1.0 | | 16 | 38 |
| G | 0 | 9 | | >135 |

Sample G, the unirradiated, 'Fluon' CD023, was found to have a very high extrusion pressure and gave a poor quality extrudate. Irradiation at even low doses not only reduced the extrusion pressure required to extrude the material under the standard test conditions but also improved the quality of the extrudate.

EXAMPLE 4

"Syloid" 404, a silica powder having a mean particle of about 10 μm sold by Grace Chemicals Limited was added to 1 kg samples of a PTFE coagulated dispersion polymer known as 'Fluon' CD1 sold by Imperial Chemical Industries Limited to give the various mixtures listed in the table below. The concentrations of "Syloid" 404 present in each sample is expressed as a percentage by weight of the weight of polymer. A substantially homogeneous mixture of the two components was obtained by gentle mixing in a tumble blender. The extrusion pressure and the compacted flow rating of the powders were determined as previously described and are recorded in the table below.

| Powder Sample | Compacted Flow Rating Scale 1 | Compacted Flow Rating Scale 2 | Extrusion Pressure (MN/m²) |
|---|---|---|---|
| 'Fluon' CD1 | 16 | | 92.0 |
| 'Fluon' CD1 + 0.1% "Syloid" 404 | >36 | 9 | 92.5 |
| 'Fluon' CD1 + 0.5% "Syloid" 404 | >36 | 9 | 106.0 |
| 'Fluon' CD1 + 1.0% "Syloid" 404 | >36 | 16 | 111.0 |
| 'Fluon' CD1 + 2.0% "Syloid" 404 | >36 | 16 | 116.0 |

The results indicate a marked improvement in flow properties of the powder but an increase in the pressure required to extrude the lubricated powder under standard conditions.

Further samples of powder blends as listed in the table above were further blended with samples of 'Fluon' CD1 irradiated in a spent fuel element pond at doses of up to 2.0 Mrads. The samples of irradiated CD1 were added at concentrations of 2% and 5% by weight of the weight of the total polymer as indicated in the table below. In the table "S" indicates "Syloid" 404 and "I" indicates irradiated 'Fluon' CD1.

| Sample | | | | Dose given to irradiated Sample 1 | Compacted Flow Rating Scale 1 | Compacted Flow Rating Scale 2 | Extrusion Pressure (MN/m²) |
|---|---|---|---|---|---|---|---|
| 'Fluon' CD1 | + 0.1%S | + | 2%I | 0.1 Mrad | >36 | 9 | 90.4 |
| do. | + do. | + | do. | 0.5 do. | >36 | 9 | 81.4 |
| do. | + do. | + | do. | 1.0 do. | >36 | 9 | 80.4 |
| do. | + do. | + | 5%I | 0.05 do. | >36 | 9 | 95.4 |
| do. | + do. | + | do. | 0.1 do. | >36 | 4 | 90.4 |
| do. | + do. | + | do. | 1.0 do. | >36 | 4 | 82.0 |
| do. | + do. | + | do. | 2.0 do. | >36 | 4 | 80.4 |
| do. | + 0.5%S | + | 2%I | 0.05 do. | >36 | 9 | 102.8 |
| do. | + do. | + | do. | 0.1 do. | >36 | 16 | 85.0 |
| do. | + do. | + | do. | 0.5 do. | >36 | 16 | 85.0 |
| do. | + do. | + | do. | 1.0 do. | >36 | 9 | 77.5 |
| do. | + do. | + | 5%I | 0.1 do. | >36 | 16 | 104.0 |
| do. | + do. | + | do. | 0.5 do. | >36 | 9 | 91.8 |
| do. | + do. | + | do. | 1.0 do. | >36 | 9 | 88.0 |
| do. | + do. | + | do. | 2.0 do. | >36 | 4 | 89.0 |
| do. | + 1.0%S | + | 2%I | 0.1 do. | >36 | 16 | 107.5 |
| do. | + do. | + | do. | 0.5 do. | >36 | 16 | 107.5 |
| do. | + do. | + | do. | 1.0 do. | >36 | 16 | 104.0 |
| do. | + do. | + | do. | 2.0 do. | >36 | 9 | 99.0 |
| do. | + do. | + | 5%I | 0.1 do. | >36 | 16 | 103.5 |
| do. | + do. | + | do. | 0.5 do. | >36 | 16 | 102.5 |
| do. | + do. | + | do. | 1.0 do. | >36 | 16 | 90.5 |
| do. | + do. | + | do. | 2.0 do. | >36 | 9 | 91.4 |

I claim:

1. A method for the production of a coagulated dispersion grade of a tetrafluoroethylene polymer suitable for paste extrusion wherein a coagulated dispersion paste extrusion grade of a tetrafluoroethylene polymer is subjected in powder form to ionising radiation until it has received a dose of irradiation with the range 0.01 to 1.0 Mrad.

2. A method according to claim 1 wherein the dose of irradiation is within the range 0.02 to 0.8 Mrad.

3. A method according to claim 1 wherein the dose of irradiation is within the range 0.05 to 0.5 Mrad.

4. A paste extrusion grade of a tetrafluoroethylene polymer produced according to claim 1.

5. A paste extrusion grade according to claim 4 in which the tetrafluoroethylene polymer comprises polytetrafluoroethylene homopolymer.

6. A paste extrusion powder comprising a blend of at least 1%, based on the weight of the blend, of the coagulated dispersion grade according to claim 4 and up to 99%, based on the weight of the blend, of a virgin coagulated dispersion grade of tetrafluoroethylene polymer.

7. A paste extrusion powder comprising a blend of from 90% to 99% by weight, based on the total weight of the blend, of a virgin coagulated dispersion grade of tetrafluoroethylene polymer containing from 0.025% to 2% by weight, based on the weight of said virgin polymer, of a flow improvement additive and from 1 to 10% by weight, based on the weight of the blend, of the coagulated dispersion powder according to claim 4.

8. A paste extrusion powder according to claim 7 in which the flow improving agent is finely divided silica.

9. A paste extrusion powder according to claim 7 in which the coagulated dispersion grades of tetrafluoroethylene comprise polytetrafluoroethylene homopolymer.

* * * * *